US011439053B2

(12) United States Patent
Chwialkowski

(10) Patent No.: US 11,439,053 B2
(45) Date of Patent: Sep. 13, 2022

(54) AGRICULTURAL IMPLEMENTS FOR CULTIVATING AGRICULTURAL WORK AREAS

(71) Applicant: CNH Industrial America LLC, New Holland, PA (US)

(72) Inventor: Pawel Chwialkowski, Chrobrego (PL)

(73) Assignee: CNH Industrial America LLC, New Holland, PA (US)

( * ) Notice: Subject to any disclaimer, the term of this patent is extended or adjusted under 35 U.S.C. 154(b) by 215 days.

(21) Appl. No.: 16/805,122

(22) Filed: Feb. 28, 2020

(65) Prior Publication Data

US 2020/0288620 A1 Sep. 17, 2020

(30) Foreign Application Priority Data

Mar. 11, 2019 (EP) ..................................... 19161984

(51) Int. Cl.
*A01B 63/10* (2006.01)
*A01B 63/00* (2006.01)
*A01B 63/111* (2006.01)
*A01B 73/04* (2006.01)

(52) U.S. Cl.
CPC ........ *A01B 63/1006* (2013.01); *A01B 63/008* (2013.01); *A01B 63/10* (2013.01); *A01B 63/111* (2013.01); *A01B 73/048* (2013.01)

(58) Field of Classification Search
CPC ... A01B 63/10; A01B 63/1006; A01B 63/008; A01B 63/111; A01B 73/048
USPC ................................................. 172/326–328
See application file for complete search history.

(56) References Cited

U.S. PATENT DOCUMENTS

| 2,821,172 | A | * | 1/1958 | Randall | A01B 63/10 |
| | | | | | 91/42 |
| 3,006,422 | A | * | 10/1961 | Mighell | A01B 35/18 |
| | | | | | 172/142 |
| 3,486,761 | A | * | 12/1969 | Fay | A01B 63/32 |
| | | | | | 280/43.23 |
| 3,705,628 | A | * | 12/1972 | King | A01B 33/024 |
| | | | | | 172/68 |
| 4,371,039 | A | * | 2/1983 | Schaaf et al. | A01B 63/32 |
| | | | | | 172/244 |
| 4,379,491 | A | * | 4/1983 | Riewerts et al. | A01B 63/22 |
| | | | | | 172/328 |

(Continued)

FOREIGN PATENT DOCUMENTS

WO WO-2015086533 A1 * 6/2015 ........... A01B 73/042

*Primary Examiner* — Tara Mayo-Pinnock
(74) *Attorney, Agent, or Firm* — Rebecca L. Henkel; Rickard K. DeMille

(57) ABSTRACT

An agricultural implement for cultivating an agricultural work area includes a main frame which is transferable between an operating position and a transfer position. A first subframe is connected to the main frame, and the first subframe is transferable between an operating position and a transfer position. A main frame hydraulic cylinder and a first subframe hydraulic cylinder move the main frame and the first subframe between their corresponding positions. In order to provide correct and repeatable positioning of the first subframe hydraulic cylinder, a volume of a first chamber of the main frame hydraulic cylinder is substantially equal to a volume of the first chamber of the first subframe hydraulic cylinder when the first subframe is in its operating position.

18 Claims, 9 Drawing Sheets

(56) References Cited

U.S. PATENT DOCUMENTS

2004/0016556 A1\* 1/2004 Barber .................. F15B 21/082
  172/452
2016/0212927 A1\* 7/2016 Sudbrink et al. ...... A01B 63/32
2017/0251587 A1\* 9/2017 Sporrer et al. ...... A01B 63/1112

\* cited by examiner

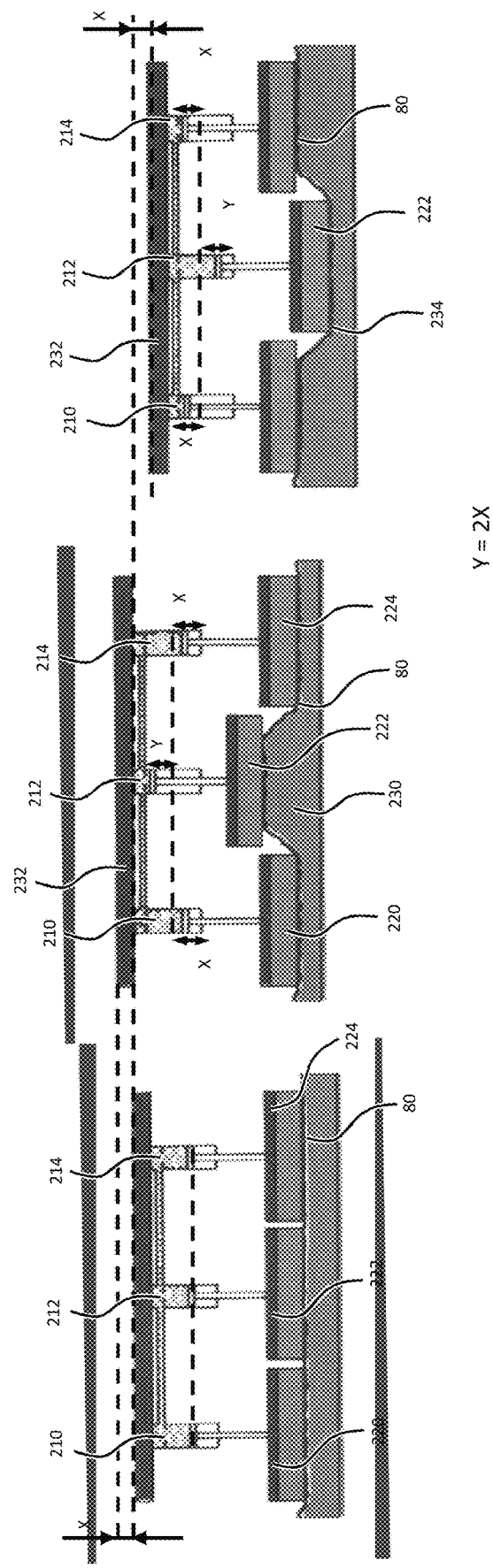

AGRICULTURAL IMPLEMENTS FOR CULTIVATING AGRICULTURAL WORK AREAS

CROSS REFERENCE TO RELATED APPLICATIONS

This non-provisional utility patent application claims the benefit of and the priority to European Patent Application No. 19161984.0 filed Mar. 3, 2019, entitled "Improvements In Or Relating To Agricultural Implements For Cultivating Agricultural Work Areas", which is hereby incorporated by reference in its entirety.

FIELD OF THE INVENTION

The invention relates generally to an agricultural implement for cultivating an agricultural work area. More specifically, the invention relates to seedbed preparation agricultural implements.

BACKGROUND OF THE INVENTION

In agriculture, farming cycles are followed that can roughly be divided into the different steps of land preparation, seed sowing, fertilizing, irrigation, crop growth, and harvesting. Each of these steps is critical to yield optimal crop results and achieve the desired returns on initial investments. Of the listed steps, land preparation is typically further divided into steps of, as necessary, clearing obstructions (e.g. bushes, stones and rocks) and subsequent tillage.

Tilling crumbles and loosens the soil, improves the soil structure and incorporates crop residues and manure into the soil, thus fertilizing the ground. The improved soil structure allows for increased plant root growth, soil aeration and water penetration/filtration. Overall this results in higher yields, better long-term soil fertility, soil moisture retention, and weed management. Tillage can be separated into primary (relatively deep) and secondary (relatively shallow) tillage. Primary tillage, such as ploughing, prepares the land to a greater depth but produces a rougher surface finish than secondary tillage. Secondary tillage (e.g. seedbed cultivation) breaks up soil clods into smaller masses which might be desirable for small seeds or plants that have minimal clod-handling ability.

Secondary tillage is a key part of seedbed preparation and is particularly important to high value crops (e.g. sugar beets, onions, etc.) whose yield bears close correlation to the level of preparation of the seedbed. Establishing a uniform seedbed (e.g. via uniform working depth, soil structure, and soil compaction) ensures fast and even germination.

In order to achieve a uniform seedbed agricultural implements are used to ensure precise levelling of the surface, adjustment of the working depth, loosening and crumbling of the soil, and the reconsolidation of the soil. These agricultural implements used to prepare uniform seedbeds are typically referred to as "seedbed cultivators" and are designed to be towed across the agricultural work area by a tractor or another suitable vehicle.

A seedbed cultivator typically comprises a frame that is attachable to a towing vehicle using coupling mechanisms such as a drawbar, ball hitch, ring hitch, etc. The frame supports a variety of agricultural tools and includes implement wheels or other ground-engaging members that help support the seedbed cultivator. The frame can be unitary, or it can be separated into a main frame and, e.g., hydraulically operated subframes. Such subframes can be lowered towards the ground surface when the agricultural implement is in operation and lifted during transportation of the agricultural implement.

The agricultural tools can be tillage tools, depth holder tools or levelling tools. Some seedbed preparation machinery might also include seeding tools to allow for seeding together with the seedbed preparation. The tillage tools, also referred to as ground-engaging tools, are used to process and loosen the soil and can be in the shape of teeth, tines or rotary members such as rollers, reels or discs.

Modern agricultural implements typically comprise powered actuation systems, such as a number of hydraulic cylinders, to allow for a main frame of the agricultural implement to switch between an operating position and a transport position. In the operating position the tillage or ground engaging tools are in contact with the ground, and the implement wheels may be elevated from the ground. In the transport position the implement wheels are in contact with the ground and the ground engaging tools are elevated from the ground, allowing the tools not to be damaged when traversing roads or other non-agricultural-work areas including field headlands.

In addition to transferring the main frame of the agricultural implement from an operating position into a transport position, the hydraulic actuators of some agricultural implements may be used to control the ground clearance of one or more subframes. The subframes are then moveable with respect to the main frame and carry at least some of the ground engaging tools. The hydraulic actuators can move the subframes between a transfer position, in which the ground engaging tools are elevate above the soil, and an operating position, in which the ground engaging tools penetrate the soil. When switching between the transfer position and the operating position, an operator controls the hydraulic system to supply hydraulic fluid to one or more chosen hydraulic cylinder until the subframe reaches the desired position. Correct positioning of the subframes with respect to the main frame is typically gauged by use of graded scales arranged on the agricultural implement. The scales inform the operator of the current position of the subframe and may include markers indicating when a desired working position is reached.

Unfortunately, operational errors frequently occur during use of the above hydraulic system. This is because machine operators often either ignore or have difficulties working with the depth gauge arranged on the agricultural implement. Incorrect positioning of the subframes, and thus also the ground engaging tools, is a typical consequence leading to unsatisfactory tillage results and potential damage to the agricultural implement. Moreover, in some scenarios (e.g. during headland routines) it may be beneficial to transfer the subframes repeatedly between their two positions. Manual initiation of such transfers by the operator may lead to incorrect timing that can cause increased wear and less desirable soil cultivation outcomes.

In view of the above problems, there is a need for solutions to prevent operational errors which could damage the agricultural implements and decrease the quality of the soil preparation.

It is an aim of the present invention to solve or at least ameliorate one or more problems of the prior art.

SUMMARY OF THE INVENTION

In one embodiment, the present disclosure refers to an agricultural implement for cultivating an agricultural work area. The agricultural implement comprises a main frame that is transferable between an operating position and a transfer position; and a first subframe connected to the main frame, the first subframe being transferable between an operating position and a transfer position. The implement further comprises a main frame hydraulic cylinder that is capable of moving the main frame between the operating position and the transfer position, said mainframe hydraulic cylinder comprising first and second chambers separated by a piston. A first subframe hydraulic cylinder is that is capable of moving the first subframe between the operating position and the transfer position, said first subframe hydraulic cylinder comprising first and second chambers separated by a piston. The main frame hydraulic cylinder and the subframe hydraulic cylinder are hydraulically connected such that movement of the main frame from its transfer position into its operating position causes hydraulic fluid in the first chamber of the main frame hydraulic cylinder to be transferred into the first chamber of the first subframe hydraulic cylinder such that the first subframe is automatically transferred from its transfer position into its operating position. When the main frame is in its transfer position, a volume of the first chamber of the main frame hydraulic cylinder is substantially equal to a volume of the first chamber of the first subframe hydraulic cylinder and the first subframe is in its operating position.

Hydraulically connecting the main frame hydraulic cylinder and the subframe hydraulic cylinder such that the first subframe hydraulic cylinder is actuated automatically as the main frame hydraulic cylinder is provided with pressurised hydraulic fluid means that both the main frame and the first subframe of the agricultural implement can be transferred between their respective two positions automatically using a single command. The operator no longer needs to activate the main frame hydraulic cylinder and the first subframe hydraulic cylinder separately. Moreover, the connection between the two hydraulic cylinders causes a sequential movement of the main frame and the first subframe, such that timing of their respective transfers is always as required and no longer needs to be carefully orchestrated by the operator.

Sizing the main frame hydraulic cylinder and the first subframe hydraulic cylinder such that their first chambers are substantially equal in volume when their respective frames are in the operating position guarantees that the first subframe hydraulic cylinder may be repeatedly put into the correct operating position, without the need for operator involvement. In other words, substantially all of the hydraulic fluid, which is present in the main frame hydraulic cylinder in the transfer position of the main frame, will be transferred to the first subframe hydraulic cylinder, which is in turn sized such that this particular volume of hydraulic fluid will move the first subframe hydraulic cylinder from its transfer position into its operating position. By activation of the main frame hydraulic cylinder, the first subframe hydraulic cylinder is automatically moved such that the subframe is transferred into its operating position with no need for the operator separately to actuate the first subframe hydraulic cylinder. Moreover, the operator no longer needs to consider the subframe depth gauge, since the working position is reached automatically in an accurate and repeatable manor.

In another embodiment, the main frame hydraulic cylinder and the first subframe hydraulic cylinder are hydraulically connected such that movement of the first subframe from its operating position into its transfer position causes hydraulic fluid in the first chamber of the first subframe hydraulic cylinder to be transferred into the first chamber of the main frame hydraulic cylinder such that the mainframe is automatically transferred from its operating position into its transfer position. In other words, hydraulic fluid may be transferred back and forth between the first chambers of the first subframe hydraulic cylinder and the main frame hydraulic cylinder. According to this embodiment, the main frame is transferred into its transfer position as a consequence of the subframe being transferred into its transfer position. It follows that the transfer into the transfer position starts with the first subframe being transferred followed by the main frame. This is particularly useful when transitioning between the main field and the headland of the working area. As will be described in more detail below, this arrangement may allow for ground engaging tools attached to the first subframe to be lifted sequentially, before all of them are lifted up further together with the main frame. This results in a particularly clean transition between the main field and the headland.

The agricultural implement may comprise a plurality of ground-engaging tools attached to the first sub frame, wherein the ground engaging tools are arranged such that they engage with the ground surface of a work area when the first subframe is in its operating position and/or are lifted above the ground surface when the first subframe is in its transfer position. In one embodiment, the ground engaging tools may be tillage tools such as tines, disc rollers, ploughshares or any other tillage device. The tillage tools may be connected to the subframe in a rigid manner, such that the ground engaging tools protrude below the subframe by a constant length and move together with the subframe. The connection of the ground engaging tools with the sub frame may be provided via a resilient member, such as a spring, to allow for vibrational movements of the ground engaging tools during use.

In yet another embodiment, the agricultural implement comprises a second subframe, the second subframe being transferable between an operating position and a transfer position by using a second subframe hydraulic cylinder, the second subframe hydraulic cylinder comprising first and second chambers separated by a piston wherein, when the main frame is in its transfer position, a volume of the first chamber of the main frame hydraulic cylinder is substantially equal to a combined volume of the first chambers of the first and second subframe hydraulic cylinders, when the first and second subframes are in their operating positions. According to this embodiment, the agricultural implement comprises a total of two subframes both of which are moveable with respect to the main frame via their respective subframe hydraulic cylinders. Similarly to previous embodiments, the first and second subframe hydraulic cylinders may be filled automatically when the main frame is transferred from its transfer position towards its operating position. In particular, hydraulic fluid in the first chamber of the main frame hydraulic cylinder may be distributed into the first chambers of the first and second subframe hydraulic cylinders simultaneously. It follows that, in this embodiment, the main frame hydraulic cylinder has to be resized such that the volume of the first chamber is sufficient to cause transfer of both the first and the second subframe hydraulic cylinders from the transfer position into the operating position. The volume of the first chambers of the first and second subframe hydraulic cylinders, in the working positions of their respective subframes, may either be substantially equal or different. It should be understood that the agricultural implement of the present disclosure may in theory include any number of subframes and corresponding subframe hydraulic cylinders. Depending on the number of subframes and corresponding subframe hydraulic cylinders, the volume of the main frame hydraulic cylinder will have to be adjusted to match the combined volume of the first chambers of all of the subframe hydraulic cylinders, in the operating position of their respective subframes.

In another embodiment, the first chamber of the first subframe hydraulic cylinder is hydraulically connected to the first chamber of the second subframe hydraulic cylinder, and the second chamber of the first subframe hydraulic cylinder is hydraulically connected to the second chamber of the second subframe hydraulic cylinder. In this embodiment, the first and second subframe hydraulic cylinders are connected in parallel, such that hydraulic fluid can flow freely between the first chambers and/or the second chambers respectively. By connecting the first and second subframe hydraulic cylinders in this way, a particularly advantageous suspension system is created. As will be described in more detail below, this arrangement allows for the first and second subframe hydraulic cylinders to compensate for uneven parts of the work area by transferring hydraulic fluid between the respective first and second chambers.

The agricultural implement may comprise a plurality of ground engaging tools attached to the second subframe, the ground engaging tools being arranged such that they engage with a ground surface of a work area when the second subframe is in its operating position and/or are lifted above the ground surface when the second subframe is in its transfer position. Similarly to the plurality of ground engaging tools attached to the first subframe, the ground engaging tools of the second subframe may be any suitable tools such as tines or disc rotors or ploughshares.

In another embodiment, the agricultural implement comprises a first wing frame pivotably connected to the main frame, wherein the first wing frame is pivotable with respect to the main frame between an operating position and a transport position. Pivoting the wing frame with respect to the main frame has the advantage that, in the transport position of the wing frame, the lateral extent of the agricultural implement is reduced. The folded wing frame is then ideally positioned for travel of the agricultural implements on roads, which require the implement to be no wider than the tractor used to tow or push the implement.

The agricultural implement may comprise a first wing frame hydraulic cylinder that is capable of moving the wing frame between the operating position and the transport position. Consequently, the first wing frame hydraulic cylinder may be attached on one end to the main frame and at a second, opposite end to the wing frame. Operation of the first wing frame hydraulic cylinder may be dependent on or independent of the operation of the main frame hydraulic cylinder.

In yet another embodiment the agricultural implement may be such that the wing frame may be transferred from its transport position into its operating position only when the main frame is in its transfer position. In other words, the first wing frame is locked into its transport position as long as the main frame remains a transport position. It follows that, in order to transfer the first wing frame into its operating position, the main frame has to be actuated first. As will be described in more detail below, this sequence prevents inadvertent damage to the first wing frame or subframes connected thereto.

In another embodiment the agricultural element comprises a subframe control valve arranged between the first chamber of the main frame hydraulic cylinder and the first chamber of the first subframe hydraulic cylinder and the control valve fluidly connects the first chamber of the main frame hydraulic cylinder and the first chamber of the first subframe hydraulic cylinder only when the first wing frame is in its operating position. This arrangement, again, helps automatically to control the correct sequence of movements of the different parts of the agricultural implement. Actuating the first subframe hydraulic cylinder before the first wing frame cylinder may result in damage to the subframe and/or incorrect positioning of the ground engaging tools attached to the subframe. This embodiment guarantees that the first subframe hydraulic cylinder does not transfer the subframe into its operating position before the first wing frame has fully reached its operating position.

The subframe may be connected to the main frame via the first wing frame, such that the first subframe is arranged to pivot with respect to the main frame together with the wing frame. According to this embodiment, the first subframe can be folded up together with the first wing frame to reduce the size of the agricultural implement when travelling on roads. Accordingly, the first wing frame hydraulic cylinder may be used to pivot both the first wing frame and the first subframe with respect to the main frame.

According to yet another embodiment, the agricultural implement comprises a pilot operated control valve arranged between the first chamber of the main frame hydraulic cylinder and the first chamber of the first subframe hydraulic cylinder. Transfer of hydraulic fluid between the first chambers of the main frame hydraulic cylinder and the first subframe hydraulic cylinder is, therefore, only possible if a predetermined pilot pressure threshold is exceeded.

The main frame may comprise a hitch for connecting the main frame to an agricultural work vehicle.

The first subframe may be moveable with respect to the main frame between its operating position and its transfer position. The ability to move the first subframe with respect to the main frame provides for the possibility to readily adjust the ground clearance of the agricultural work implement.

In another embodiment of the disclosure, the first subframe hydraulic cylinder is partially extended, particularly between 10% and 90% of its full extension, preferably around 75%, when the first subframe is in its operating position. If the first subframe hydraulic cylinder is not fully extended in its operating position, the latter may also be used as a suspension when the first sub frame is in its operating position.

In other embodiments of the disclosure, an agricultural machinery is provided comprising any of the above agricultural implement embodiments connected to the front and/or rear of an agricultural vehicle.

The agricultural vehicle may include one or more control devices, such as but not limited to programmable or non-programmable processors. Similarly, the agricultural implement may include one or more control devices, such as but not limited to programmable or non-programmable processors. Additionally or alternatively, the agricultural implement may be controlled by one or more control devices of the agricultural vehicle. Similarly, the agricultural vehicle may be controlled by one or more control devices of the agricultural implement.

The agricultural vehicle and/or the agricultural implement may be remote controlled, e.g. from a farm office. Accordingly, the agricultural vehicle may include one or more communication interfaces for connection to a remote processor and/or a remote controller. Similarly, the agricultural implement may include one or more communication interfaces for connection to a remote processor and/or a remote controller.

Within the disclosure of this application, it is expressly intended that the various aspects, embodiments, examples and alternatives set out in the preceding paragraphs, and the claims and/or the following description and drawings, and in particular the individual features thereof, may be taken independently or in any combination as would occur to the person of skill in the art. That is, all embodiments and all features of any embodiment can be combined in any way and/or combination, unless such features are incompatible.

BRIEF DESCRIPTION OF THE DRAWINGS

One or more embodiments of the disclosure will now be described by way of non-limiting example only, with reference to the accompanying drawings, in which:

FIG. 10 shows a perspective view of the embodiment of the agricultural implement of FIG. 1A in the operating position;

FIGS. 6A to 6C show schematic representations of the main and subframes travelling over different ground surfaces.

DETAILED DESCRIPTION OF THE DRAWINGS

Figure 1A:
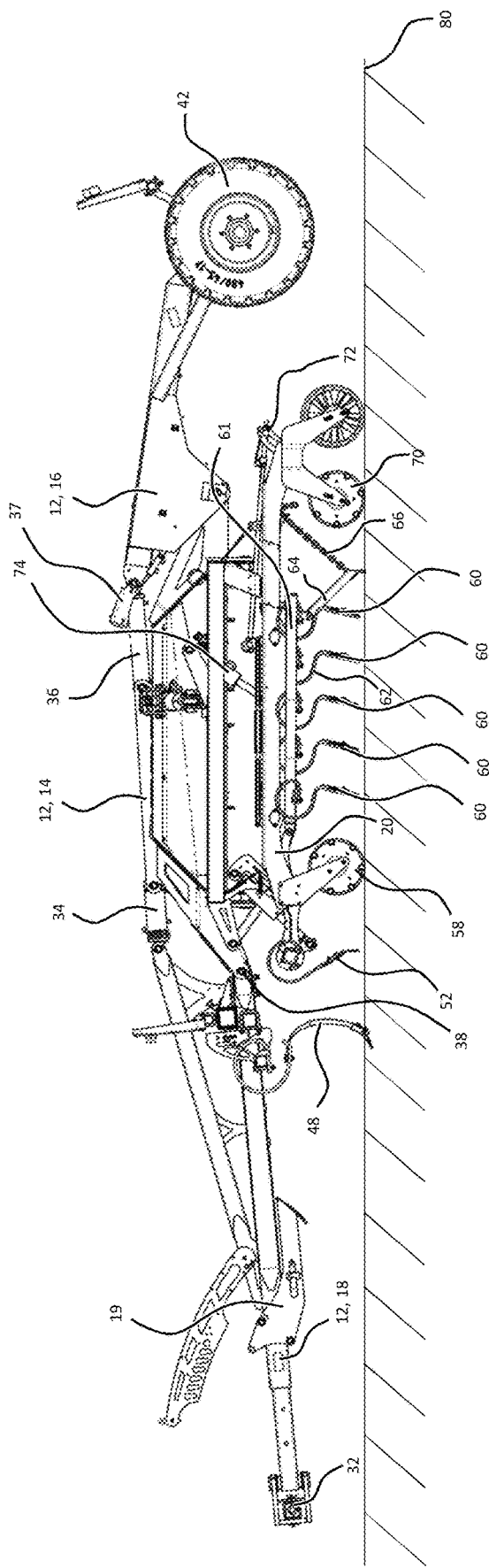
FIG. 1A shows a side view of an embodiment of an agricultural implement, according to the disclosure, in an operating position.
Figure 1B:
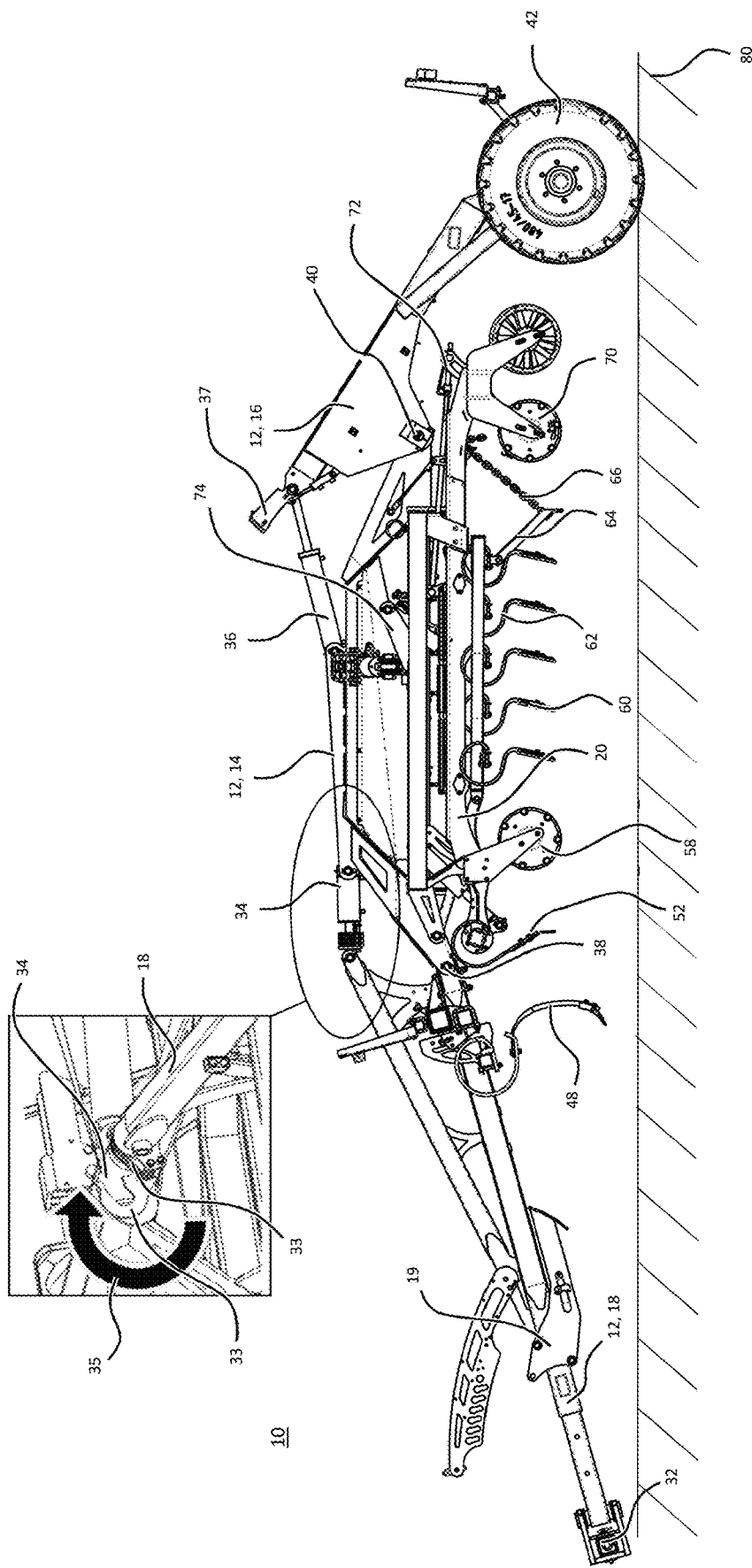
FIG. 1B shows a side view of the agricultural implement of FIG. 1A in a transfer position.
Figure 1C:
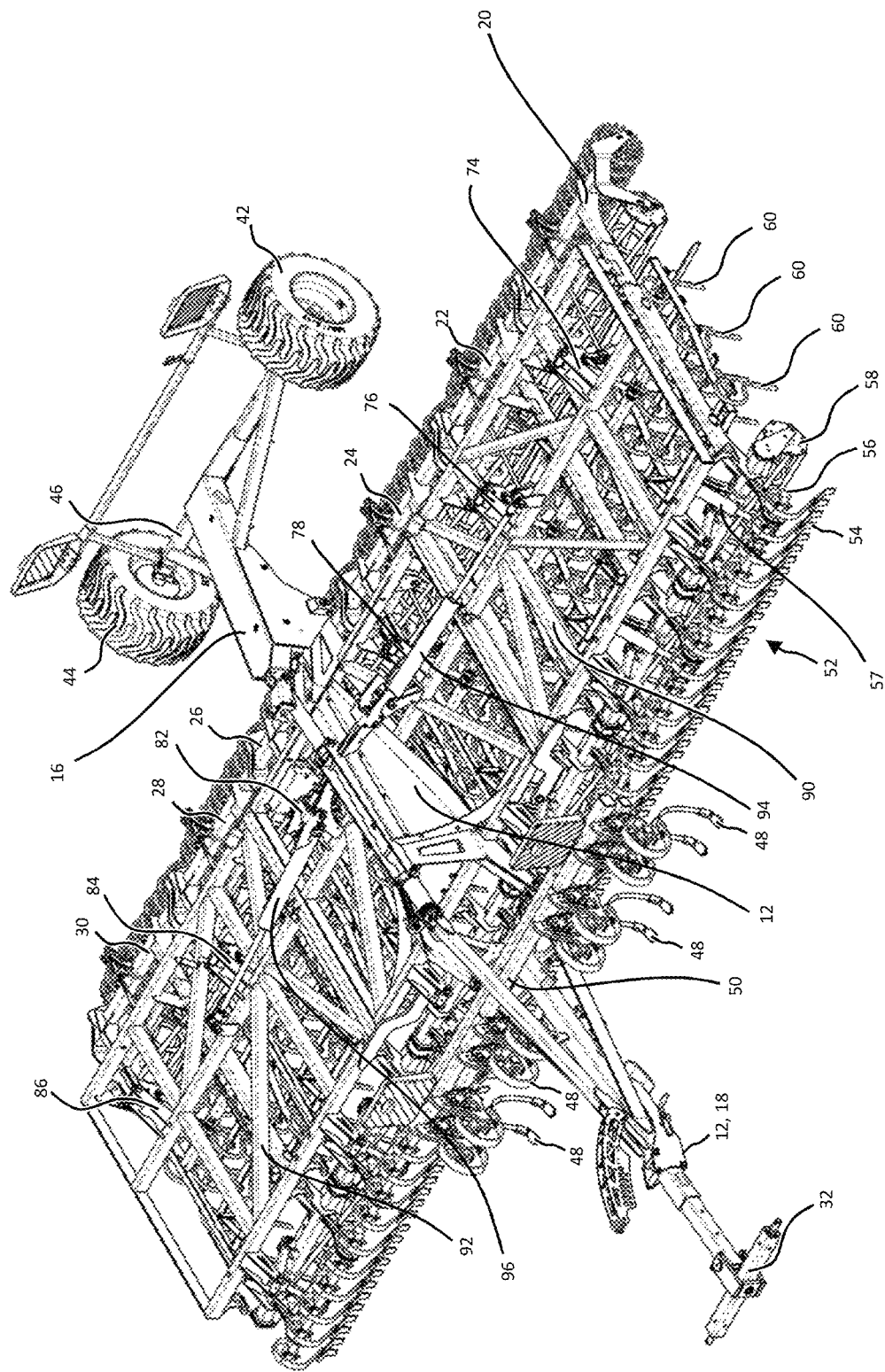
FIG. 1D shows a perspective view of the agricultural implement of FIG. 1A in a transport position.
Figure 1D:
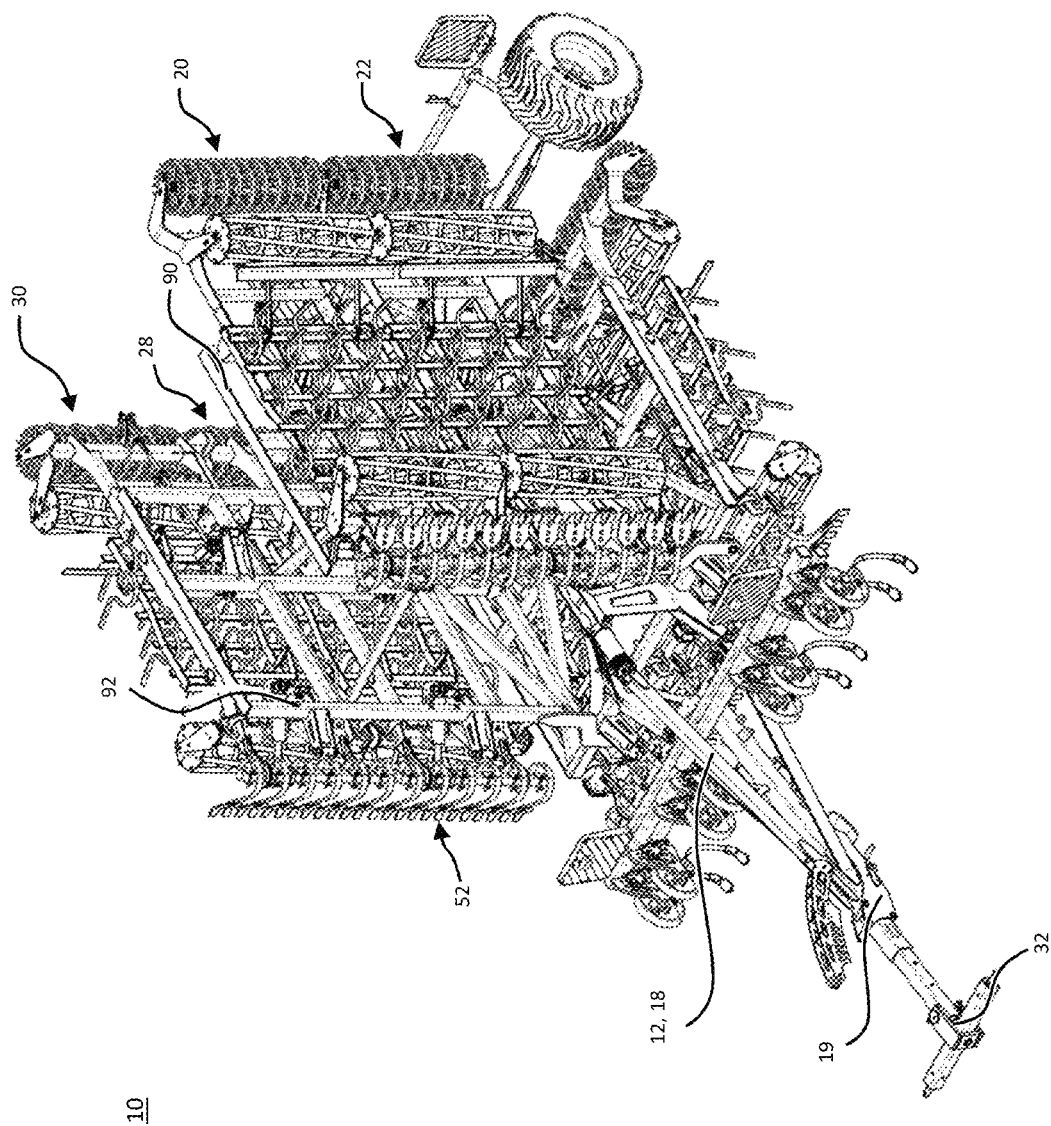

Referring to FIGS. 1A to 1D, there is shown an embodiment of an agricultural implement according to the disclosure, in varying positions. FIGS. 1A and 1C show the agricultural implement 10 in its operating position. FIG. 1B shows the agricultural implement 10 in a transfer position. FIG. 1D shows the agricultural implement in a transport position.

The agricultural implement 10 shown in FIGS. 1A to 1D is a seedbed cultivator for creating a high-quality seedbed in ploughed conditions. Seedbed cultivators, such as the one shown in FIGS. 1A to 1D, turn over the soil, either before planting the seeds to aerate the soil and prepare a smooth seed bed or after the crop has begun growing, so as to kill weeds. It will be understood, however, that the present disclosure is not limited to the use of seedbed cultivators but may generally also be suitable for use with most other tillage devices, including but not limited to a harrow or a plough.

Figure 2:
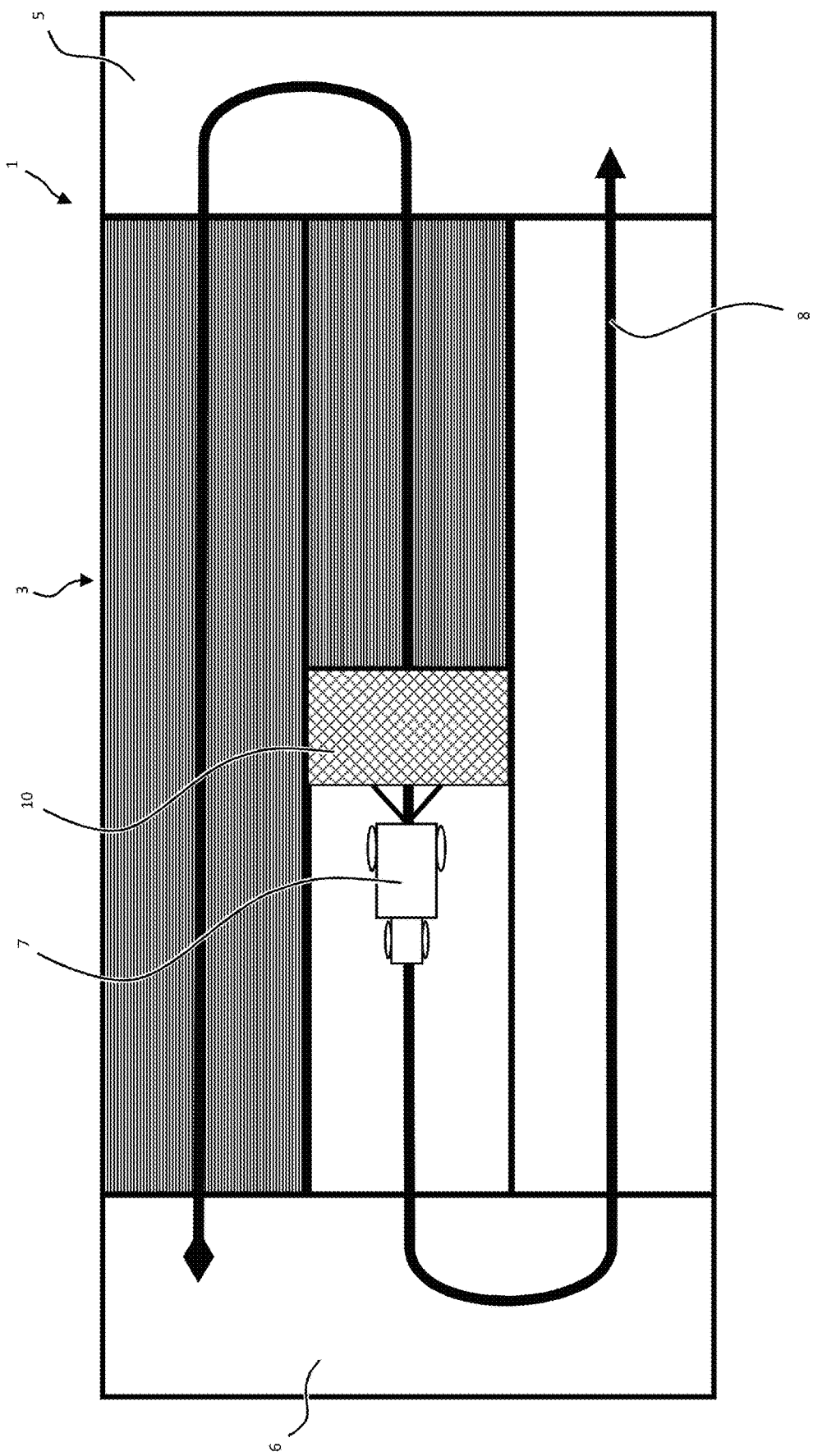
FIG. 2 shows a schematic trajectory of an agricultural work vehicle with an agricultural implement.

Turning to FIG. 2, a typical operation of an agricultural machinery comprising a tractor 7 and an agricultural implement 10 is described to clarify the meaning of the "operating position" and the "transfer position". In use, the agricultural implement 10 is drawn as an attachment (implement) behind a towing vehicle (e.g. a tractor), as can be derived schematically from FIG. 2. FIG. 2 shows a schematic work area 1, e.g. a crop field, which is divided into a main field 3 and headlands 5, 6. A tractor 7 draws the agricultural implement 10 across the main field 3 in generally parallel working rows. Of course, the agricultural implement 10 could also be pushed in front of the tractor 7 or the tractor could simultaneously push and tow agricultural implements. The working rows are part of the tractor trajectory 8 of the tractor and typically run in parallel with a long edge of the work area 1. At the end of each working row, the tractor 7 and implement 10 use the respective headland 5 or 6 for turning around, as indicated by trajectory 8. It is known in the art that soil on the headlands 5, 6 is subject to greater levels of soil compaction as it receives more traffic per unit of area than the main field 3. In order not to disturb the soil of the headlands 5 and 6 more than necessary, it is known to lift ground engaging tools of the agricultural implement 10 off the ground, into a headland or transfer position (FIG. 1B), before the implement reaches the headland 5, 6. Once the tractor 7 and the corresponding implement 10 have turned on the headland 5, 6, the ground engaging tools of agricultural implement 10 are, again, lowered (towards the operating position of FIG. 1A) to engage the soil of the main field 3.

In the illustration of FIG. 2, the agricultural implement 10 is working on the main field 3 and, therefore, is arranged in the operating position. The operating position is represented in FIGS. 1A and 1C. As the implement reaches the border between the headland 5, 6 and the main field 3, the agricultural implement 10 is transferred into the transfer position, shown in FIG. 1B. It follows that each working row starts with an adjustment of the agricultural implement 10 from the transfer position into the operating position and ends with an adjustment of the agricultural implement 10 from the operating position into the transfer position. This process and the corresponding parts will be described in more detail below with reference to FIGS. 1A to 1D.

The agricultural implement 10 comprises a main frame 12, which is connected to one or more subframes 20, 22, 24, 26, 28, and 30 (FIG. 1C). The main frame 12 comprises a central frame 14, a wheel frame 16, and a drawbar 18. The drawbar 18 is connected to a hitch 32 for coupling the agricultural implement to the back of a corresponding tractor. The drawbar 18 is connected to the central frame 14 via a drawbar hydraulic cylinder 34. A kickstand 19 is pivotably connected to the drawbar 18. The drawbar hydraulic cylinder 34 is arranged such that actuation of the latter causes pivotal movement of the drawbar frame 18 with respect to the central frame 14.

The drawbar hydraulic cylinder comprises a plurality of spacer elements 33. Each of the spacer elements 33 is pivotable between a first position, in which the spacer element 33 does not affect the movement of the drawbar hydraulic cylinder 34, and a second position, in which the spacer element 33 covers a small part of the length of the cylinder rod of the drawbar hydraulic cylinder 34. A pivotal movement of the spacer elements 33 between their first position and their second position is indicated by arrow 35 in FIG. 1B. The spacer elements 33 that are in the second position, therefore, limit the drawbar hydraulic cylinder's range of motion. In more detail, the spacer elements 33 that are in the second position limit the retraction of drawbar hydraulic cylinder 34. When drawbar hydraulic cylinder 34 tries to retract, the cylinder rod can not be fully retracted if at least some of the spacer elements 33 are in their second position, as illustrated in FIG. 1B. That is, even if the drawbar hydraulic cylinder 34 is full retracted, the cylinder rod will still protrude from the cylinder housing by an amount that is equal to the combined thickness of all of the spacer elements 33, which are in their second position. As will be described in more detail below, the spacer elements 33 are used to ensure that the agricultural implement is parallel to the ground surface 80, when the drawbar hydraulic cylinder 34 is in its retracted position, i.e. resting against the spacer elements 33 that are in their second position.

A main frame hydraulic cylinder 36 is arranged between the central frame 14 and the wheel frame 16. The main frame hydraulic cylinder 36 is arranged such that actuation of the latter causes pivotal movement of the wheel frame 16 with respect to the central frame 14.

Extension of the drawbar hydraulic cylinder 34 causes pivotal movement of the central frame with respect to the drawbar frame 18 about drawbar pivot 38, as can be derived from a comparison of FIGS. 1A and 1B. Similarly, extension of the main frame hydraulic cylinder 36 causes the wheel frame 16 to pivot with respect to the central frame 14 about wheel frame pivot 40. The pivoting movement of wheel frame 16 about wheel frame pivot 40 is, again, derivable from a comparison of FIGS. 1A and 1B.

As shown in FIG. 1C, two implement wheels 42 and 44 are attached either side of the wheel frame 16. To this end, both wheels 42 and 44 are connected to a wheel axle 46, which in turn is connected to the wheel frame 16.

In the embodiment of FIGS. 1A to 1D, six subframes 20, 22, 24, 26, 28, and 30 are attached to the main frame 14. The subframes 20, 22, 24, 26, 28, and 30 are movable with respect to the main frame 14, mainly in a vertical direction.

A variety of different kinds of ground engaging tools 48, 52, 58, 60, 64 and 70 are connected to different parts of the frame structure. Each of the subframes 20, 22, 24, 26, 28, and 30 carries ground engaging tools 52, 58, 60, 64, and 70.

At a front end of the agricultural implement 10 and connected to the drawbar frame 18, there are provided a plurality of track eradicators 48. Track eradicators 48 are fitted to the agricultural implement 10 to compensate for wheel tracks left by the tractor wheels during the tillage operation. The quantity and size of the track eradicator tines can be changed to accommodate the number of wheels on the tractor. In the example of FIG. 10, four track eradicators pairs 48 are provided to compensate for the impressions left by a dual wheel tractor, each of the track eradicators pairs 48 comprising two eradicator tines. Each of the track eradicators pairs 48 is connected to the drawbar frame 18 via a track eradicator rail 50 extending laterally either side of the drawbar frame 18.

A front levelling arrangement 52 is arranged at a front end of subframes 20, 22, 24, 26, 28, and 30. The front levelling arrangement 52 in this embodiment consists of a plurality of tines with working plates 54. The tines of the front levelling arrangement 52 are arranged in close proximity to each other. The front levelling arrangement 52 is configured to level out the soil ahead of front roller 58, which will be described in more detail below. As such, the front levelling arrangement eliminates much of the unevenness of the top soil and provides for a smoother and more efficient run of the subframes 20 to 30 across the top soil. The individual tines of the front levelling arrangement 52 are connected to a common front rail 56, which in turn is connected to the subframes 20 to 30. The front rail 56 is connected to subframes 20 to 30 via one or more hydraulic cylinders 57, which allow precise adjustment of the front levelling arrangement 52 depth with respect to the corresponding subframes 20 to 30.

Front rollers 58 are arranged on each of the subframes 20 to 30 behind the front levelling arrangement 52. The front rollers 58 are configured as crumbling rollers for improvement of the soil by crumbling of clods in the work area. As will be described in more detail below, the front rollers 58 control the depth of the subframes 20 to 30 together with the pairs of rear rollers 70.

Each of the subframes 20 to 30 includes a plurality of tines 60 arranged between the front rollers 58 and the pairs of rear rollers 70. In the embodiment of FIGS. 1A to 1D, each of the subframes 20 to 30 includes five rows of straight tines 60. The tines 60 are rigidly connected to a tine frame 61 and have a coil shaped head portion 62, which allows elastic deformation of the tines when hard objects in the work area, such as stones or rocks, are encountered. Each subframe 20 to 30 comprises a tine frame 61 that is moveable (upwards and downwards) with respect to the subframe 20 to 30 to adjust the working depth of the tines 60. The individual tines 60 of each row are located at 5 to 10 cm intervals to ensure sufficient cultivation and mixing of the soil A rear levelling board 64 is arranged on each subframe 20 to 30 of the agricultural implement 10. The ground clearance of rear levelling boards 64 can be adjusted via an adjustment chain 66. The rear levelling boards 64 provide a light levelling effect of the open soil behind tines 60, leaving a level surface for further crumbling consolidation by the pair of rear rollers 70.

The rear rollers 70 are formed as a dual roller arrangement. However, it will be appreciated that any other roller arrangement, such as single rollers, can be utilised to suit local soil conditions and demands of crumbling and reconsolidation. The rear rollers 70, together with the front rollers 58, carry the weight of the agricultural implement 10 when the implement 10 is in its operating position (FIG. 1A) and define the ground clearance of the subframes 20 to 30.

In the operating position (FIGS. 1A and 1C), the ground engaging tools 48, 52, 58, 60, 64 and 70 are brought into contact with the ground surface 80. To this end, the main frame 12 is lowered by retracting the drawbar hydraulic cylinder 34 and the main hydraulic cylinder 36. As a consequence of retracting the main frame hydraulic cylinder 36, the wheel frame 16 is lifted such that implement wheels 42 and 44 are no longer contacting the ground surface 80. It follows that the weight of the agricultural implement is transferred to the ground via the ground engaging tools 48, 52, 58, 60, 64 and 70.

It will be appreciated that all of the ground engaging tools 48, 52, 58, 60, 64 and 70 of the agricultural implement 10 have to be arranged at the correct level with respect to the ground surface 80. To bring the front and rear rollers 58, 70 into engagement with the ground surface 80, each of the subframes 20 to 30 is connected with at least one corresponding subframe hydraulic cylinder. In the example of FIG. 1A, the first subframe 20 is connected to a first subframe hydraulic cylinder 74. The first subframe hydraulic cylinder 74 in FIG. 1A is at least partially extended, such that the first subframe 20 is arranged in its operating position. In the operating position, the front and rear rollers 58, 70 of the first subframe 20 are in contact with the ground surface 80.

The first subframe hydraulic cylinder 74 is arranged in such a way that the rod of the cylinder is only partly extended when the first subframe 20 is in its operating position. In one embodiment, the first subframe hydraulic cylinder 74 is extended by around 75% in the operating position of the first subframe 20.

Each of the remaining subframes 22, 24, 26, 28, and 30 include corresponding subframe hydraulic cylinders 76, 78, 82, 84, and 86 that have the same functionality as the first hydraulic subframe cylinder 74. For example, a second subframe hydraulic cylinder 76 is connected to the second subframe 22 and configured to transfer the second subframe 22 between a transfer position and an operating position. The same is true for the third, fourth, fifth and sixth frame hydraulic cylinders 78, 82, 84, 86, which are configured to transfer their corresponding third, fourth, fifth and sixth subframes 24, 26, 28, 30 between their operating position and their transfer position.

In the operating position of the first subframe 20, the tine frame 61 is positioned such that the tines 60 penetrate the ground surface 80 by a desired depth, depending on the status of the soil. In order to adjust the working depth of the tines 60 with respect to the subframes 20 to 30 and their corresponding rollers 58, 70, each of the tine frames 61 includes a tine depth adjustment mechanism 72. The depth adjustment mechanisms 72 are capable of moving their tine frames 61 with respect to their corresponding subframes 20 to 30. The tine depth adjustment mechanism 72 of the embodiment shown in FIGS. 1A to 1D is a manually adjustable screw type mechanism. However, it is also feasible to implement an electrically or hydraulically actuated adjustment mechanism instead. The tine depth adjustment mechanism 72 is typically used by the operator before starting the cultivating process to adjust the working depth of the tines 60 depending on the soil conditions.

As mentioned above, in the operating position (FIG. 1A) of the first subframe 20, the front and rear rollers 58, 70 rest on the ground surface 80 (or up to 5 cm below the surface in looser soils). Before starting the tillage process, the operator will use depth adjustment mechanism 72 to lower the tines 60 so they penetrate the ground surface 80 by an initial depth, whenever the first subframe 20 is put in its operating position. For example, the tines 60 may be lowered until a depth of around 10 cm below the ground surface 80 is reached. The same process is repeated for the remaining subframes 22, 24, 26, 28, 30 and their corresponding tines 60. Once the initial depth is set, the operator will perform a test run to gauge the actual working depth of the tines achieved. The actual working depth might differ from the initial working depth, particularly in looser soils, in which the rollers 58, 70 may sink slightly during operation. Should the actual working depth not match the initial depth setting, the operator can then re-adjust the depth adjustment mechanism to achieve the desired working depth.

The subframe hydraulic cylinders 74, 76, 78, 82, 84, 86 are all partially extended in the operating position of the agricultural implement 10. Consequently, the subframes 20 to 30 are in their operating position, i.e. engaging with the ground surface 80, when the agricultural implement 10 is in its operating position. The same applies to the main frame 12, which is in its operating position, when the agricultural implement 10 is in the operating position.

The operating position of FIG. 1A is assumed during work on the main field 3 shown in FIG. 2. As mentioned before, during the turning procedure on headlands 5 and 6, the agricultural implement 10 is moved into its transfer position shown in FIG. 1B.

In the transfer position, all of the ground engaging tools 48, 52, 58, 60, 64, 70 are lifted off the ground surface 80. In order to lift the ground engaging tools 48, 52, 58, 60, 64, 70 off the ground surface 80, the agricultural implement 10 of the present disclosure moves the main frame 12 from its operating position (FIG. 1A) into a transfer position as illustrated in FIG. 1B. In addition, the agricultural implement 10 moves each of the subframes 20, 22, 24, 26, 28 and 30 from their operating positions into a transfer position shown in FIG. 1B.

When transferring the main frame 12 from its operating position into its transfer position, the main frame hydraulic cylinder 36 is extended as shown in FIG. 1B. As a consequence of extending the main frame hydraulic cylinder 36, the wheel frame 16 is lowered, such that the agricultural implement wheels 42 and 44 engage with the ground surface 80, thereby lifting the ground engaging tools 48, 52, 58, 60, 64, and 70 partially off the ground. It will be appreciated that the weight of the main frame 12 is then distributed between the implement wheels 42, 44 and the tractor via hitch 32.

To fully lift the track eradicators 48 off the soil, the drawbar hydraulic cylinder 34 is also extended in the transfer position of the agricultural implement 10. In other words, in the transfer position of FIG. 1B, both the main frame hydraulic cylinder 36 and the drawbar hydraulic cylinder 34 are extended to pivot the drawbar 18 and the wheel frame 16 about their respective pivots 38, 40.

In order to further increase the ground clearance of the front and rear rollers 58, 70 as well as the tines 60 and the rear levelling plates 64, each of the subframes 20 to 30 is lifted into its transfer position by means of their respective subframe hydraulic cylinders 74, 76, 78, 82, 84, and 86. This happens in sequence with the transfer of the main frame from its operating position into the transfer position. In FIG. 1B, the transfer position of the first subframe 20 is illustrated. In this transfer position, the first subframe 20 is pulled closer to the main frame 12 by means of the first subframe hydraulic cylinder 74. It will be appreciated that the second to sixth subframes 22, 24, 26, 28, and 30 of the agricultural implement 10 are lifted into similar transfer positions by their respective subframe hydraulic cylinders 76, 78, 82, 84, and 86.

In summary, when moving the agricultural implement 10 between its operating position and its transfer position, the main frame is transferred from its operating position into its transfer position, whereas each of the subframes 20 to 30 is transferred from its operating position into its transfer position. The transfer position of the agricultural implement 10 is maintained for as long as the agricultural implement 10 is located on the headlands 5 or 6. Once the turning procedure on the headlands 5, 6 is completed, the agricultural implement 10 is moved back from its transfer position of FIG. 1B into the operating position of FIGS. 1A and 10.

As will be described in more detail below, it is one advantage of the present disclosure that movement of the main frame 12 between its operating position and its transfer position is directly related to movement of the subframes 20 to 30 from their operating position into their transfer position. In particular, as the main frame 12 is transferred from the operating position into the transfer position by means of the main frame hydraulic cylinder 36, the sub frame hydraulic cylinders 74, 76, 78, 82, 84, and 86 are automatically supplied with hydraulic fluid from the main frame cylinder 36 to lift their respective subframes 20 to 30 from their operating position into their transfer position.

In the reverse, when the agricultural implement is transferred from its operating position into its transfer position, the subframes 20 to 30 are first moved into their transfer position, by lifting the subframes 20 to 30 off the ground via their respective subframe hydraulic cylinders 74, 76, 78, 82, 84, and 86. This movement of the subframe hydraulic cylinders 74, 76, 78, 82, 84, 86 causes hydraulic fluid to be transferred to the main frame hydraulic cylinder 36, such that the main frame 12 is subsequently and automatically transferred between its transfer position and its operating position.

Turning to FIG. 1D, there is shown the agricultural implement 10 in its transport position. This position is assumed when the agricultural implement 10 is towed behind the tractor on roads, usually before and after working in the field.

In order to transfer the agricultural implement into its transport position, four of the six subframes, namely the first, second, fifth, and sixth subframes 20, 22, 28, and 30 are folded up, that is pivoted with respect to the main frame 12. To this end, the agricultural implement comprises a first wing frame 90 and a second wing frame 92. The first and second wing frames 90, 92 are pivotally connected to the main frame 12. Accordingly, both the first and second wing frames 90, 92 can be transferred between an operating position shown in FIGS. 1A to 1C and a transport position shown in FIG. 1D.

The first wing frame 90 carries the first and second subframes 20, 22. The second wing frame 92 carries the fifth and sixth subframes 28, and 30. The first and second subframes 20, 22 are, therefore, pivotable together with the first wing frame 90. The fifth and sixth subframes 28 and 30 are, in turn, pivotable together with the second wing frame 92.

As is best derivable from FIG. 10, the agricultural implement 10 comprises a first wing frame hydraulic cylinder 94 and a second wing frame hydraulic cylinder 96. The first wing frame hydraulic cylinder 94 is configured to transfer the first wing frame 90 between its operating position shown in FIG. 1C and its transport position shown in FIG. 1D. Similarly, the second wing frame hydraulic cylinder 96 is configured to transfer the second wing frame 92 between its operating position shown in FIG. 1C and its transport position shown in FIG. 1D. The first wing frame hydraulic cylinder 94 is connected at a back end with the main frame 12 and at an opposite rod end with the first wing frame 90. The second wing frame hydraulic cylinder 96 is connected at a back end with the main frame 12 and at an opposite rod end with the second wing frame 92.

In the transport position of the agricultural implement 10 shown in FIG. 1D, the main frame is in a transport position, which differs from the operating position and the transfer position of the main frame. In the transport position of the main frame, the main frame hydraulic cylinder 36 is partially retracted such that the ground engaging tools 48, 52, 58, 60, 64, 70 are lifted off the ground surface 80 and. In the transport position of the main frame, the main frame hydraulic cylinder 36 is locked in this partially retracted position (not shown) by a transport lock 37. In other words, the transport lock 37 will stop the main frame hydraulic cylinder 36 from retracting fully, such that the ground engaging tools 48, 52, 58, 60, 64, 70 will remain elevated during transport. The subframes 20 to 30 are in their transfer positions, whereas the first and second wing frames 90, 92 are in their transport positions, when the agricultural implement is in its transport position. Finally, the drawbar hydraulic cylinder 34 is retracted until it rests against the spacer elements 33.

When transferring the agricultural implement 10 from its operating position into the transport position, the subframes 20 to 30 are lifted into their transfer position by pressurising the rod-side chambers of the corresponding subframe hydraulic cylinders 74, 76, 78, 82, 84, 86. As a consequence of the retraction of the subframe hydraulic cylinders 74, 76, 78, 82, 84, 86, the main frame hydraulic cylinder 36 is automatically extended (as described above) to transfer the main frame into the transfer position. The transport lock 37 is then engaged with the main frame hydraulic cylinder 36 such that, when pressure is removed from the first, piston-side chamber 112 of the main frame hydraulic cylinder 36, the latter is locked into a partially retracted position. The main frame 12 hydraulic cylinder will remain in the partially retracted position for as long as the transport lock 37 is engaged. At the same time, the drawbar hydraulic cylinder 34 is retracted until it rests against the spacer elements 33. Once this sequence is completed, the main frame 12 is fully transferred into the transport position. Only then will the first and second wing frame hydraulic cylinders 94, 96 be actuated (retracted) in order to fold up the first and second wing frames 90, 92 to transfer the latter into their respective transport positions. Once the wing frames reach their transport position, the transfer of the agricultural implement to its transport position is completed.

In the reverse process, when the agricultural implement is transferred from the transport position into the operating position, the main frame is first transferred from its transport position into its transfer position. In other words, the transport lock 37 on the main frame hydraulic cylinder 36 is removed and the main frame hydraulic cylinder 36 is fully extended. At the same time, the drawbar hydraulic cylinder 34 is fully extended. Once the main frame hydraulic cylinder and the drawbar hydraulic cylinder 34 are fully extended, a wing lock will be released and the wing frames 90, 92 are transferred into their operating positions, i.e. unfolded by means of their wing frame hydraulic cylinders 94, 96. As a next step, the main frame hydraulic cylinder 36 and the drawbar hydraulic cylinder 34 are retracted, thereby moving the main frame 12 from its transfer position into the operating position. As described before, fluid from the main frame hydraulic cylinder 36 is automatically transferred to the subframe hydraulic cylinders 74, 76, 78, 82, 84, 86, when the main frame hydraulic cylinder 36 is retracted. Consequently, movement of the subframes 20 to 30 from their transfer position into the operating position follows the transfer of the main frame 12 between the transfer position and the operating position, such that eventually the operating position shown in FIG. 1A is assumed.

Figure 3:
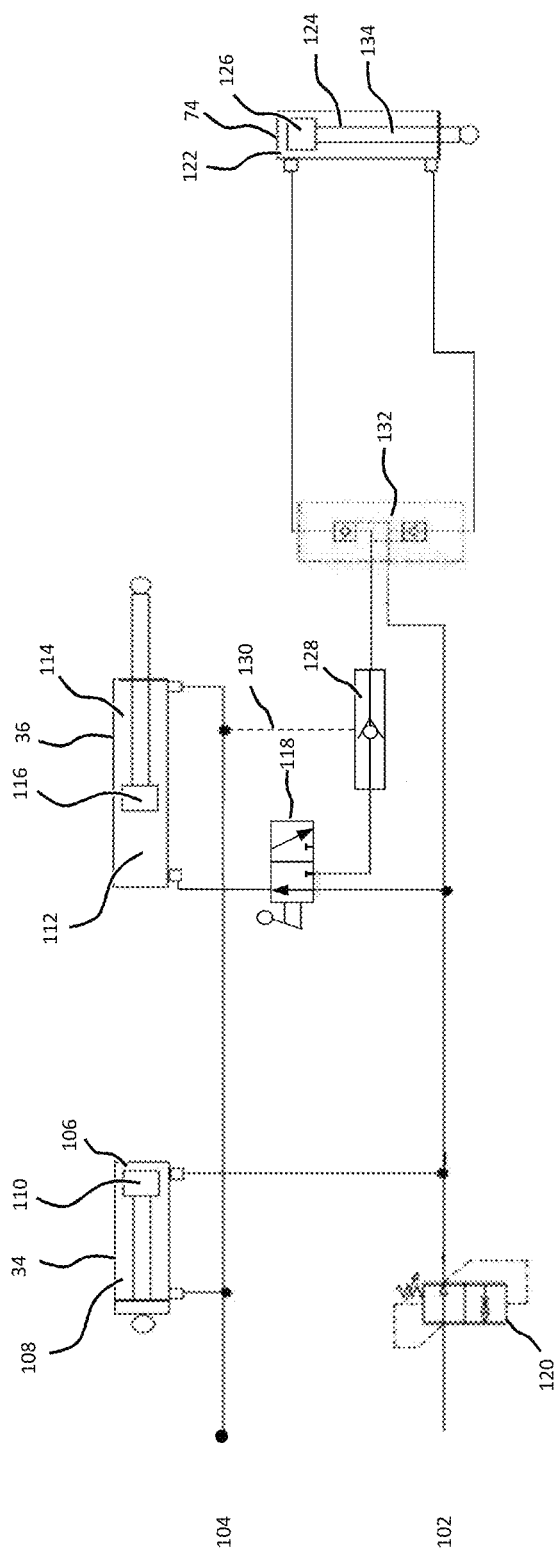
FIG. 3 shows a schematic view of a hydraulic system used in embodiments of the disclosure in a first state.

A schematic of a hydraulic system used to operate the drawbar hydraulic cylinder 34, the main frame hydraulic cylinder 36, and the first subframe hydraulic cylinder 74 is depicted in FIG. 3. Although the agricultural implement 10 in FIGS. 1A to 1D is depicted as an implement with six separate subframes 20 to 30, it will be understood that this is not a necessary requirement for this invention. Rather, this invention is also applicable to embodiments in which only one subframe and, therefore, only one subframe hydraulic cylinder 74 are provided.

The hydraulic system 100 shown in FIG. 3 comprises a first port 102 and a second port 104. Both ports 102, 104 are connected to a hydraulic supply system of the towing vehicle, such as the hydraulic pump of a tractor. Pressurised hydraulic fluid can be supplied to either of the first and second ports 102, 104.

The drawbar hydraulic cylinder 34 comprises a first, piston-side chamber 106 separated from a second, rod-side chamber 108 by a piston 110. The main frame hydraulic cylinder 36 comprises a first, piston-side chamber 112 separated from a second rod-side chamber 114 by a piston 116. The first subframe hydraulic cylinder 74 comprises a first, piston-side chamber 122 separated from a second rod-side chamber 124 by a piston 126.

First port 102 is connected to the first chamber 106 of the drawbar hydraulic cylinder 34. The first port 102 is connectable to the first chamber 112 of main frame hydraulic cylinder 36 via control valve 118.

The second port 104 is connected to the second chamber 108 of drawbar hydraulic cylinder 34. The second port 104 is connected to second chamber 114 of the main frame hydraulic cylinder 36. A flow restrictor 120 may be provided between the first port 102 and the respective first chambers 106, 112 of the drawbar and main frame hydraulic cylinders 34, 36.

The first chamber 112 of the main frame hydraulic cylinder 36 is connectable to a first rod-side chamber 122 of the first subframe hydraulic cylinder 74 by switching control valve 118. As depicted in FIG. 3, control valve 118 is a lever activated valve that can be used to connect the first chamber 112 of the main frame hydraulic cylinder 36 to the first port 102 in its first position. In its second position (FIG. 4), control valve 118 connects said first chamber 112 of the main frame hydraulic cylinder 36 to the first chamber 122 of the first subframe hydraulic cylinder 74.

A pilot operated check valve 128 is arranged between the first chamber 112 of the main frame hydraulic cylinder 36 and the first chamber 122 of the first subframe hydraulic cylinder 74. Check valve 128 allows free flow of hydraulic fluid from the first chamber 122 of the first subframe hydraulic cylinder 74 towards the first chamber 112 of the main frame hydraulic cylinder 36. However, check valve 128 blocks flow form the first chamber 112 of the main frame hydraulic cylinder 36 towards the first chamber 122 of the first subframe hydraulic cylinder 74, until a predetermined pilot pressure is reached at pilot port 130 of check valve 128. The pilot operated check valve 128 is connected to the second port 104 and the second chambers 108, 114 of the drawbar hydraulic cylinder 34 and the main frame hydraulic cylinder 36. Once pressure in the second chambers 108, 114 of the hydraulic cylinders 34, 36 has reached the pilot pressure threshold, pilot operated check valve 128 will allow free flow of hydraulic fluid from first chamber 112 of the main frame hydraulic cylinder 36 towards the first chamber 122 of the first subframe hydraulic cylinder 74.

A further pilot operated check valve arrangement 132 is provided between the first and second chambers 122, 124 of the first subframe hydraulic cylinder 74 and the first and second ports 102, 104 the functionality of which will be explained in more detail with reference to FIG. 5.

As mentioned above, when the agricultural implement 10 is in its transport position (FIG. 1D), the drawbar hydraulic cylinder 34 and the main frame hydraulic cylinder 36 are extended, whereas the subframe hydraulic cylinders 74, 76, 78, 82, 84, 86 are retracted. In the hydraulic system 100, this is achieved by transferring the control valve 118 into its first position (FIG. 3), such that hydraulic fluid that is supplied via the first port is pushed into the first chambers 106, 112 of the drawbar hydraulic cylinder 34 and the main frame hydraulic cylinder 36. A build-up of pressure in first chambers 106 and 112 will cause the corresponding hydraulic cylinders 34 and 36 to extend. At the same time, hydraulic fluid is supplied via first port 102 towards the second chamber 124 of the first subframe hydraulic cylinder 74. This causes the first subframe hydraulic cylinder 74 to retract. This configuration is maintained until the agricultural implement reaches the working area 1.

Figure 4:
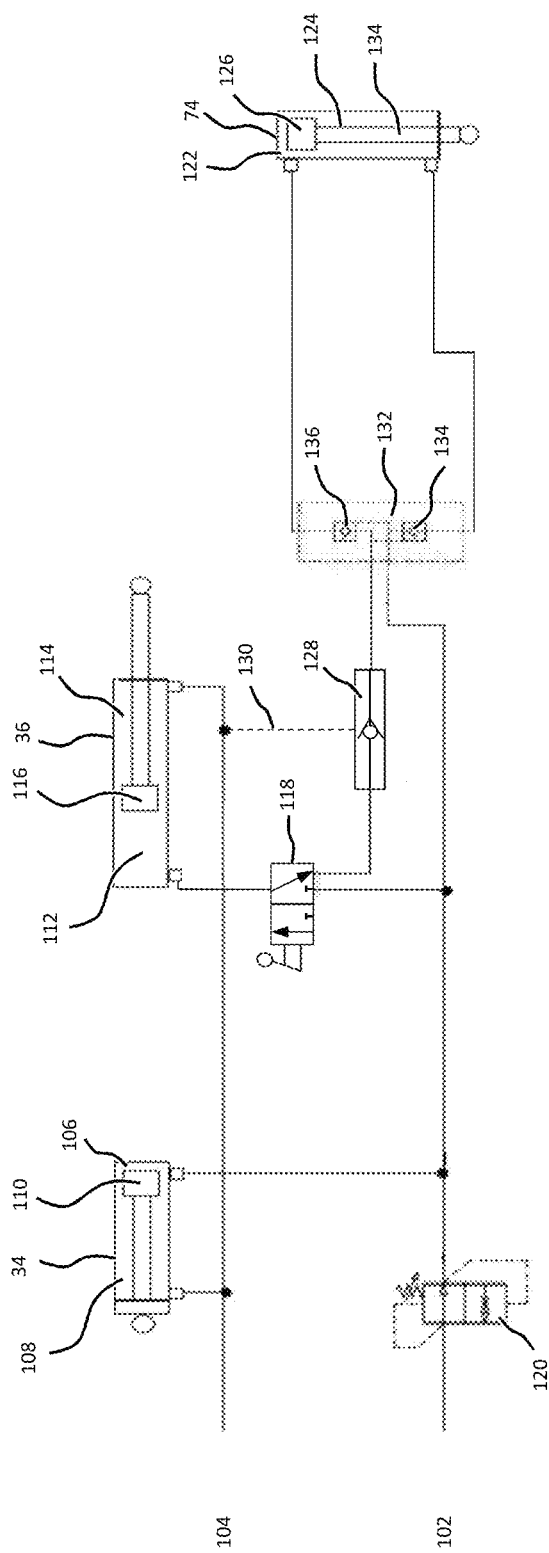
FIG. 4 shows a schematic view of the hydraulic system of FIG. 3 in a second state.

Once the working area is reached the agricultural element 10 is transferred from its transport position into its operating position. In a first step, wing frames 90, 92 are unfolded into their operating position (wing frame hydraulic schematics not represented in FIGS. 3 and 4). Once, the wing frames 90, 92 have been transferred into their operating position, control valve 118 is switched into its second position, shown in FIG. 4. Hydraulic fluid is then provided at the second port 104 of hydraulic system 100. Hydraulic fluid entering the hydraulic system 100 via second port 104 is transferred into the second chambers 108, 114 of the hydraulic cylinders 34, 36, causing pistons 110, 116 and their corresponding rods to be retracted as a consequence of the pressure build-up in second chambers 108 and 114. In the illustration of FIG. 4, the drawbar hydraulic cylinder 34 is already fully retracted and hydraulic fluid initially present in the first chamber 106 of the drawbar hydraulic cylinder 34 pushed towards first port 102, back into the hydraulic system of the tractor.

Due to the presence of pilot operated check valve 128, movement of the main frame hydraulic cylinder 36 is slightly delayed in comparison to the drawbar hydraulic cylinder 34. In particular, retraction of the main frame hydraulic cylinder 36 is only possible once the pressure in second chambers 108, 114 exceeds the pilot pressure of check valve 128. It is only then that piston 116 and the corresponding rod can move towards the first chamber 112, thereby pushing hydraulic fluid out of said first chamber 112 towards the first chamber 122 of the first subframe hydraulic cylinder 74. During this part of the operation, control valve 118 is in its second position, in which the first chambers 112 and 122 of hydraulic cylinders 36 and 74 are connected.

As the main frame hydraulic cylinder 36 is retracted due to the pressure build-up in its second chamber 114, hydraulic fluid is pushed out of first chamber 112 towards the first chamber 122 the first subframe hydraulic cylinder 74. As a result, piston 126 of the first subframe hydraulic cylinder 74 will move towards the second chamber 124, thereby extending rod 134. In other words, as the main frame hydraulic cylinder 36 is retracted, the first subframe hydraulic cylinder 74 is automatically extended. This way of actuation synchronizes movements of the main frame 12 with movements of the first subframe 20. In particular, as the main frame 12 is transferred from its transfer position towards its operating position, the first subframe 20 is transferred from the transfer position into its operating position. This synchronization of movements of the main frame 12 and the subframe 20 will help the operator in creating straight borders between the headlands 5, 6 and the main field 3.

Connecting the main frame hydraulic cylinder 36 with the first subframe hydraulic cylinder 74 may also be used to enable automatic and accurate positioning of the first subframe hydraulic cylinder 74 in the operating position of the first subframe 20. The main frame hydraulic cylinder 36 and the first subframe hydraulic cylinder 74 are sized such that fluid transferred from the main frame hydraulic cylinder 36 towards the first subframe hydraulic cylinder 74 is sufficient to extend the first subframe hydraulic cylinder 74 into its working position yet not enough to fully extend the first subframe hydraulic cylinder. In other words, the first chamber 122 of the first subframe hydraulic cylinder 74 has a larger maximum volume than the first chamber 112 of the main frame hydraulic cylinder 36. In embodiments of the present disclosure, the maximum volume of the first chamber 112 of the main frame hydraulic cylinder 36 (i.e. when the main frame hydraulic cylinder is fully extended) is around 25% smaller than the volume of the first chamber 122 of the first subframe hydraulic cylinder 74, when the latter is in its operating position. According to this embodiment, the first subframe hydraulic cylinder 74 will be extended by around 75%, when the main frame hydraulic cylinder 36 reaches its fully retracted state.

Although this is not specifically represented in FIGS. 3 and 4, the first subframe hydraulic cylinder 74 may be transferred into a floating position once the agricultural implement 10 has reached it operating position. In the floating position, the first subframe hydraulic cylinder 74 is arranged such that its first and second chambers 122, 124 are connected and hydraulic fluid can move between the two. In this configuration, the first subframe hydraulic cylinder 74 may be used as a damping cylinder for impacts experienced by the first subframe 20 when working the field.

In the reverse operation, i.e. when the agricultural implement is transferred from its operating position (FIG. 1A) into its transfer position (FIG. 1B), hydraulic fluid is supplied to the hydraulic system 100 via first port 102. In this case, control valve 118 is still in its second position shown in FIG. 4. Hydraulic fluid entering the hydraulic system 100 via first port 102 is transferred into the first chamber 106 of the drawbar hydraulic cylinder 34 causing piston 110 and its corresponding rod to be extended as a consequence of the pressure built up in first chamber 106. At the same time, hydraulic fluid is supplied from first port 102 towards the second chamber 124 of the first subframe hydraulic cylinder 74 via check valve 134 of check valve arrangement 132. The pressurised hydraulic fluid supplied via the first port 102 will also act to open check valve 136 via the corresponding pilot ports, such that free flow of hydraulic fluid between the first chambers 112 and 122 of hydraulic cylinders 36, 74 is possible for as long as pressurised hydraulic fluid is supplied via first port 102.

It will be understood that, in the operating position, the first subframe hydraulic cylinder 74 is partially extended, despite FIG. 4 showing the hydraulic cylinder 74 in a fully retracted state.

As hydraulic pressure builds up in the second chamber 124 of the first subframe hydraulic cylinder 74, the piston 126 will move towards the first chamber 122, thereby pushing hydraulic fluid out of the first chamber 122 and towards the first chamber 112 of the main frame hydraulic cylinder 36. In other words, as the first subframe hydraulic cylinder 74 is retracted, the main frame hydraulic cylinder 36 is extended, since the amount of hydraulic fluid transferred between first chambers 112 and 122 is sufficient to fully extend the main frame hydraulic cylinder 112. This exchange of hydraulic fluid, therefore, leads to a transfer of the first subframe 20 into its transfer position and, at the same time, moves the main frame 12 into its transfer position. Due to the drawbar 34 being extended at the same time, the agricultural implement 10 will reach its transfer position by supplying hydraulic fluid via the first port 102.

Figure 5:
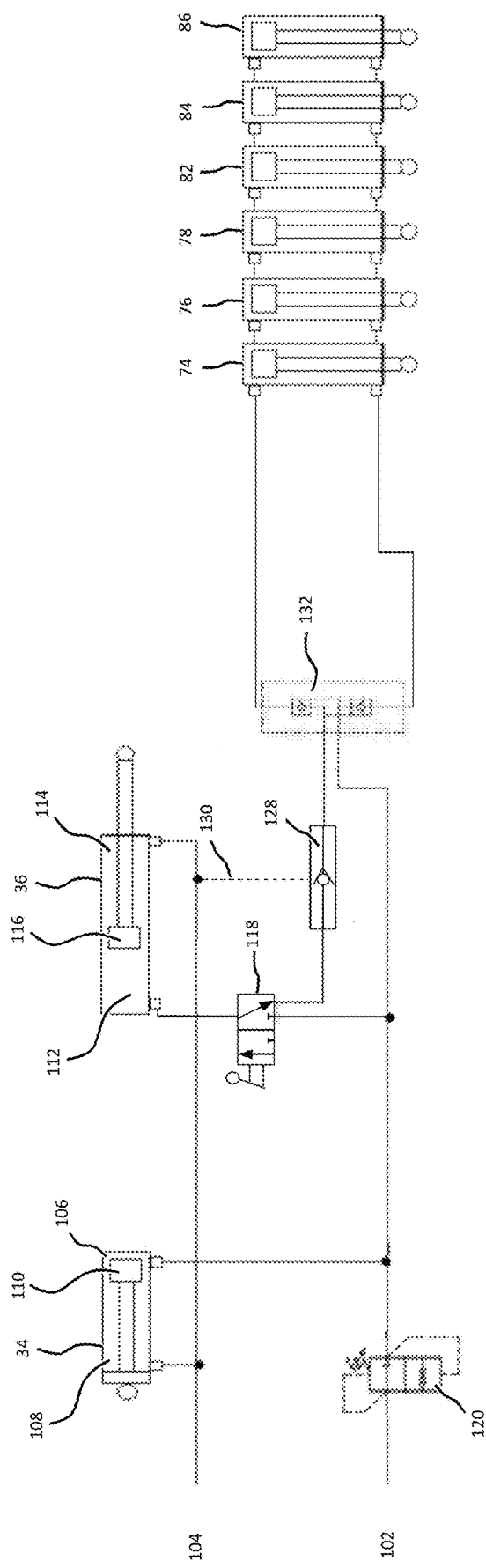
FIG. 5 shows a schematic view of a hydraulic system used in embodiments of the disclosure.

Turning to FIG. 5, there is shown a different embodiment of a hydraulic system 200. The hydraulic system 200 of FIG. 5 differs from the hydraulic system 100 in FIGS. 3 and 4 mainly in that six subframe hydraulic cylinders 74, 76, 78, 82, 84, 86 are provided. Elements of this embodiment with the same functionality as in the hydraulic system 100 of FIGS. 3 and 4 are labelled with the same reference numerals.

The hydraulic system 200 of FIG. 5 may be directly applied to the agricultural implement 10 of FIGS. 1A to 1D. As such, hydraulic system 200 comprises first, second, third, fourth, fifth and sixth subframe hydraulic cylinders 74, 76, 78, 82, 84, 86. The six subframe hydraulic cylinders 74, 76, 78, 82, 84, 86 are connected in parallel, that is the first piston side chambers of the subframe hydraulic cylinder 74, 76, 78, 82, 84, 86 are connected and communicate with each other. Similarly, the second, rod-side chambers of the subframe hydraulic cylinders 74, 76, 78, 82, 84, 86 are connected to each other and can communicate with each other.

A main difference between the hydraulic system 200 and the hydraulic system 100 is that the volume of the main frame hydraulic cylinder 36 is significantly increased. This is because, in the hydraulic system 200 of FIG. 5, the hydraulic fluid in the first chamber 112 of the main frame hydraulic cylinder 36 is used to move all of the six subframe hydraulic cylinders 74, 76, 78, 82, 84, 86 into their partially extended operating position. It follows that the maximum volume of the first chamber 112 of the main frame hydraulic cylinder 36 (i.e. the volume in the fully extended state of the main frame hydraulic cylinder 36) needs to match the combined volume of the first chambers of each of the subframe hydraulic cylinders 74, 76, 78, 82, 84, 86, when their respective subframes are in the operating position. In one example, if the volume of each of the first chambers of the subframe hydraulic cylinders 74, 76, 78, 82, 84, and 86 is one litre in the operating position of the subframes (e.g. when the subframes hydraulic cylinders are extended by approximately 75%), then it follows that the maximum volume of the first chamber 112 of the main frame hydraulic cylinder 36 will be around 6 litres.

By feeding all of the subframe hydraulic cylinders 74, 76, 78, 82, 84, 86 with hydraulic fluid from the first chamber 112 of the main frame hydraulic cylinder 36, it will be guaranteed that all of the subframe hydraulic cylinders end up in the same, desirable position at similar times.

Due to their parallel connection, the first to sixth subframe hydraulic cylinders 74, 76, 78, 82, 84, 86 act as a suspension system for the agricultural implement, when the latter is in its operating position. A schematic representation of the suspension concept is illustrated in FIGS. 6A to 6C. In the example of FIGS. 6A to 6C, only three subframe hydraulic cylinders 210, 212, 214 are shown, although the concept is identically applicable to the six-cylinder arrangement of FIG. 5 or any other number of subframe hydraulic cylinders.

In FIG. 6A the ground surface 80 is even and the corresponding subframes 220, 222, 224 are level with each other. It follows that all of the subframe hydraulic cylinders 210, 212, 214 are in a similar position.

If, as schematically represented by FIG. 6B, the second subframe 222 encounters an obstacle 230, the piston of the second subframe hydraulic cylinder 212 experiences increased lifting forces, thereby pressurising the hydraulic fluid in the piston-side chamber of the second subframe hydraulic cylinder 212. Since the subframe hydraulic cylinders 210, 212 and 214 are connected in parallel, their corresponding piston-side chambers are interconnected such that hydraulic fluid in the piston-side chamber of the second subframe hydraulic cylinder 212 can be pushed towards the piston-side chambers of the first and third subframe hydraulic cylinders 210, 214. As a consequence of the transferal of hydraulic fluid between the three subframe hydraulic cylinders 210, 212, 214, the piston of the second subframe hydraulic cylinder 212 moves towards the piston-side by an amount Y, whereas the pistons of the first and third subframe hydraulic cylinders 210, 214 move towards their respective rod-sides by an amount X. Since the subframe hydraulic cylinders 210, 212, 214 are generally sized identically, it follows that Y=2X. In other words, the piston of the second subframe hydraulic cylinder 212 travels twice as far as the pistons of the first and third subframe hydraulic cylinders 210, 214. It further follows that the first and third subframe hydraulic cylinders 210 and 214 both extend by an amount X. Since the two subframe hydraulic cylinders 210, 214 cannot push their respective subframes 220, 224 significantly further into the ground, it follows that the main frame 232 is instead lifted roughly by amount X.

The opposite is the case in the scenario illustrated in FIG. 6C, in which the second subframe 222 encounters a hole or groove 234. In this scenario, the second subframe hydraulic cylinder 212 will extend by an amount Y, whereas the first and second subframe hydraulic cylinders 210, 214 will be compressed by an amount X, wherein Y=2X. In this scenario, the main frame 232 of the agricultural implement is lowered by the amount X in comparison to the scenario of FIG. 6A.

It will be appreciated that the functionality described with respect to FIGS. 6A to 6C will only be available for as long as the subframe hydraulic cylinders are not fully extended in a level condition, such as the one shown in FIG. 6A. The agricultural implement of the present invention guarantees that, once the agricultural implement is in its operating position, each of the subframe hydraulic cylinders is filled to the right level (i.e. only partially extended) to enable the aforementioned suspension functionality.

The agricultural implement 10 in FIGS. 1A to 1D is depicted as an implement with six separate subframes 20 to 30, yet it should be understood that this is not a necessary requirement for this invention. Rather, this invention is applicable to embodiments with any number of subframes. Although the above embodiments referred to agricultural implements with one, three or six subframe hydraulic cylinders, it will be understood that the number of subframe hydraulic cylinders is also not limiting for the scope of the present disclosure. Indeed, any number of subframe hydraulic cylinders can be utilised per subframe for as long as the main frame hydraulic cylinder is sized accordingly. Similarly, the invention is not limited to the use of a single main frame hydraulic cylinder. Rather, any number of main frame hydraulic cylinders may be used, in which case their combined volume needs to match the combined volume of the subframe hydraulic cylinders.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the disclosure.

What is claimed is:

1. An agricultural implement for cultivating an agricultural work area, the agricultural implement comprising:
    a main frame being transferable between an operating position and a transfer position;
    a first subframe connected to the main frame, the first subframe being transferable between an operating position and a transfer position;
    a main frame hydraulic cylinder that is capable of moving the main frame between the operating position and the transfer position, said main frame hydraulic cylinder comprising first and second chambers separated by a piston;
    a first subframe hydraulic cylinder that is capable of moving the first subframe between the operating position and the transfer position, said first subframe hydraulic cylinder comprising first and second chambers separated by a piston,
    wherein the main frame hydraulic cylinder and the first subframe hydraulic cylinder are hydraulically connected such that movement of the main frame from its transfer position into its operating position causes hydraulic fluid in the first chamber of the main frame hydraulic cylinder to be transferred into the first chamber of the first subframe hydraulic cylinder such that the first subframe is automatically transferred from its transfer position into its operating position,
    wherein, when the main frame is in its transfer position, a volume of the first chamber of the main frame hydraulic cylinder is substantially equal to a volume of the first chamber of the first subframe hydraulic cylinder when the first subframe is in its operating position, and
    wherein the main frame includes a drawbar connected thereto, and the drawbar includes a drawbar hydraulic cylinder having a plurality of spacers, each spacer elements of the plurality of spacers pivotable between a first position, which does not affect the movement of the drawbar hydraulic cylinder, and a second position, in which one or more spacers covers a portion of the length of a cylinder rod of the drawbar hydraulic cylinder to limit a range of movement of the drawbar hydraulic cylinder, the drawbar hydraulic cylinder and the plurality of spacers configured to adjust the main frame relative to the ground.

2. The agricultural implement of claim 1, wherein the main frame hydraulic cylinder and the first subframe hydraulic cylinder are hydraulically connected such that movement of the first subframe from its operating position into its transfer position causes hydraulic fluid in the first chamber of the first subframe hydraulic cylinder to be transferred into the first chamber of the main frame hydraulic cylinder such that the main frame is automatically transferred from its operating position into its transfer position.

3. The agricultural implement of claim 2, wherein the agricultural implement comprises a plurality of ground engaging tools attached to the first subframe, wherein the ground engaging tools are arranged such that they engage with a ground surface of a work area when the first subframe is in its operating position and/or are lifted above the ground surface when the first subframe is in its transfer position.

4. The agricultural implement of claim 1, wherein the agricultural implement comprises a second subframe, the second subframe being transferable between an operating position and a transfer position using a second subframe hydraulic cylinder, the second subframe hydraulic cylinder comprising first and second chambers separated by a piston, wherein, when the main frame is in its transfer position, a volume of the first chamber of the main frame hydraulic cylinder is substantially equal to a combined volume of the first chambers of the first and second subframe hydraulic cylinders, when the first and second subframes are in their operating positions.

5. The agricultural implement of claim 4, wherein the first chamber of the first subframe hydraulic cylinder is hydraulically connected to the first chamber of the second subframe hydraulic cylinder, and wherein the second chamber of the first subframe hydraulic cylinder is hydraulically connected to the second chamber of the second subframe hydraulic cylinder.

6. The agricultural implement of claim 5, wherein the agricultural implement comprises a plurality of ground engaging tools attached to the second subframe, wherein the ground engaging tools are arranged such that they engage with a ground surface (80) of a work area when the second subframe is in its operating position and/or are lifted above the ground surface when the second subframe is in its transfer position.

7. The agricultural implement of claim 1, wherein the agricultural implement comprises a first wing frame pivotably connected to the main frame, wherein the first wing frame is pivotable with respect to the main frame between an operating position and a transport position.

8. The agricultural implement of claim 7, wherein the agricultural implement comprises a first wing frame hydraulic cylinder that is capable of moving the first wing frame between the operating position and the transport position.

9. The agricultural implement of claim 8, wherein the agricultural implement is adapted such that the first wing frame may be transferred from its transport position into its operating position only when the main frame is in its transfer position.

10. The agricultural implement of claim 7, wherein the agricultural element comprises a subframe control valve arranged between the first chamber of the main frame hydraulic cylinder and the first chamber of the first subframe hydraulic cylinder, and wherein the control valve is capable of fluidly connecting the first chamber of the main frame hydraulic cylinder and the first chamber of the first subframe hydraulic cylinder only when the first wing frame is in its operating position.

11. The agricultural implement of claim 10, wherein the first subframe is connected to the main frame via the first wing frame, such that the first subframe is arranged to pivot with respect to the main frame together with the first wing frame.

12. The agricultural implement of claim 1, wherein the agricultural implement comprises a pilot operated control valve arranged between the first chamber of the main frame hydraulic cylinder and the first chamber of the first subframe hydraulic cylinder.

13. The agricultural implement of claim 1, wherein the main frame comprises a hitch for connecting the main frame to an agricultural work vehicle.

14. The agricultural implement of claim 1, wherein the first subframe is moveable with respect to the main frame between its operating position and its transfer position.

15. The agricultural implement of claim 1, wherein, in the operating position of the first subframe, the first subframe hydraulic cylinder is partially extended, between 10% and 90% of its full extension.

16. The agricultural implement of claim 15, wherein, in the operating position of the first subframe, the first subframe hydraulic cylinder is partially extended at 75% of its full extension.

17. The agricultural implement of claim 16, wherein when the one or more spacers of the plurality of spacers are positioned in the second position, the cylinder rod of the drawbar hydraulic cylinder will protrude from the cylinder housing by an amount equal to a combined thickness of the plurality of spacers positioned over the cylinder rod of the drawbar hydraulic cylinder when the drawbar hydraulic cylinder is fully retracted.

18. The agricultural implement of claim 1, wherein when one or more spacers of the plurality of spacers are positioned in the second position, the drawbar hydraulic cylinder is unable to fully retract.

* * * * *